United States Patent
Lammi et al.

(10) Patent No.: US 8,726,697 B2
(45) Date of Patent: May 20, 2014

(54) CONVECTION HEATING FURNACE FOR HEATING A GLASS SHEET

(75) Inventors: Petri Lammi, Kyröskoski (FI); Esa Lammi, Kangasala (FI)

(73) Assignee: Glassrobots Oy, Pirkkala (FI)

( * ) Notice: Subject to any disclaimer, the term of this patent is extended or adjusted under 35 U.S.C. 154(b) by 707 days.

(21) Appl. No.: 12/518,925

(22) PCT Filed: Dec. 13, 2007

(86) PCT No.: PCT/FI2007/000294
§ 371 (c)(1),
(2), (4) Date: Jun. 12, 2009

(87) PCT Pub. No.: WO2008/071833
PCT Pub. Date: Jun. 19, 2008

(65) Prior Publication Data
US 2010/0031703 A1 Feb. 11, 2010

(30) Foreign Application Priority Data

Dec. 13, 2006 (FI) .................................. 20061104
Mar. 5, 2007 (FI) .................................. 20070187

(51) Int. Cl.
*C03B 29/08* (2006.01)
*C03B 29/00* (2006.01)

(52) U.S. Cl.
USPC .................................. 65/273; 65/114; 65/119

(58) Field of Classification Search
USPC ...................... 65/90, 95, 335, 114–119, 273; 373/27–41
See application file for complete search history.

(56) References Cited

U.S. PATENT DOCUMENTS

| | | | |
|---|---|---|---|
| 4,230,474 A | 10/1980 | Roth et al. | |
| 6,050,814 A * | 4/2000 | Lewandowski | 432/159 |
| 6,064,040 A | 5/2000 | Muller et al. | |
| 6,470,711 B1 * | 10/2002 | Jarvinen et al. | 65/273 |
| 7,448,232 B2 | 11/2008 | Jarvinen et al. | |
| 7,748,237 B2 * | 7/2010 | Zhao | 65/273 |
| 2004/0148969 A1 * | 8/2004 | Nikander | 65/114 |
| 2006/0123848 A1 * | 6/2006 | Lammi | 65/29.19 |

FOREIGN PATENT DOCUMENTS

WO    WO 9801398 A1 *  1/1998    .............. C03B 29/08

* cited by examiner

*Primary Examiner* — Jodi C Franklin
(74) *Attorney, Agent, or Firm* — Stites & Harbison PLLC; Douglas E. Jackson

(57) ABSTRACT

A convection heating furnace for a glass sheet, into which oven glass sheet (3) arrives along a hauling track, as on moving rolls (4), and said furnace further comprises of heating elements (12), in order to heat the air, which is blasted against glass sheet (3), a blaster and blast air channelling in order to blast said air against the glass sheet, and the blast air channelling has, elongated channels (1), into which at least a part of the blast air heating elements 12 are fitted, and each channel comprises air blasting means on its flank directed against the glass sheet (3). As air blast elements there are nozzle groups fixed on the channel (1) flank, where the nozzle group formed of sheet metal, as of two, into shape formed sheets joined together to form a casing, whereby said casing comprises one or several for blast air directed discharge channels (6), and the direction of air flow in said casing (2) is essentially in the same direction as in said discharge channels (6).

6 Claims, 2 Drawing Sheets

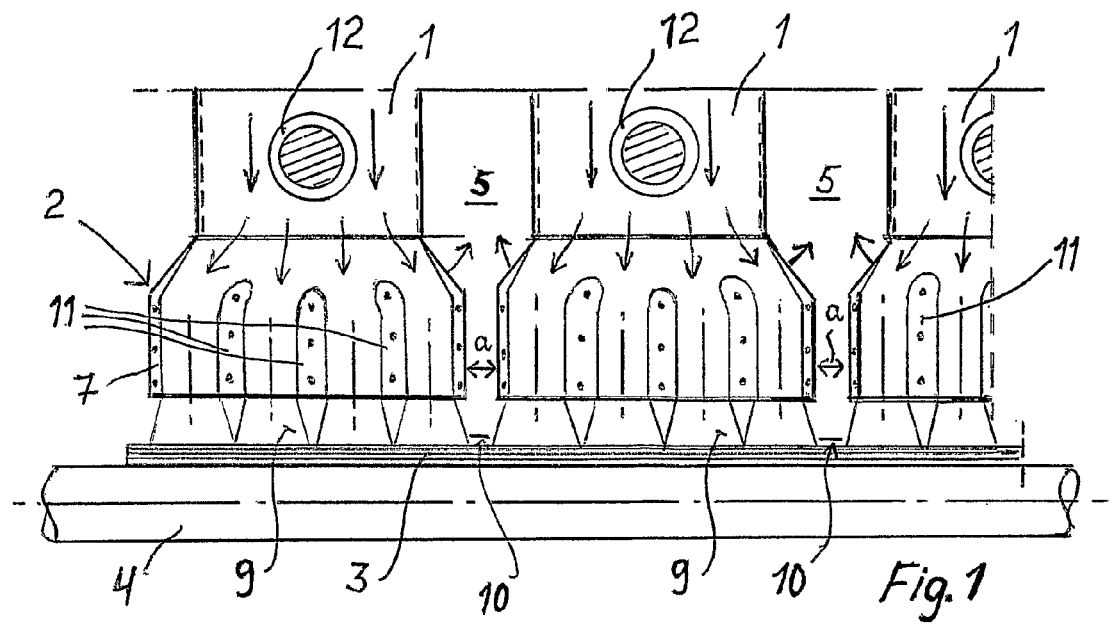
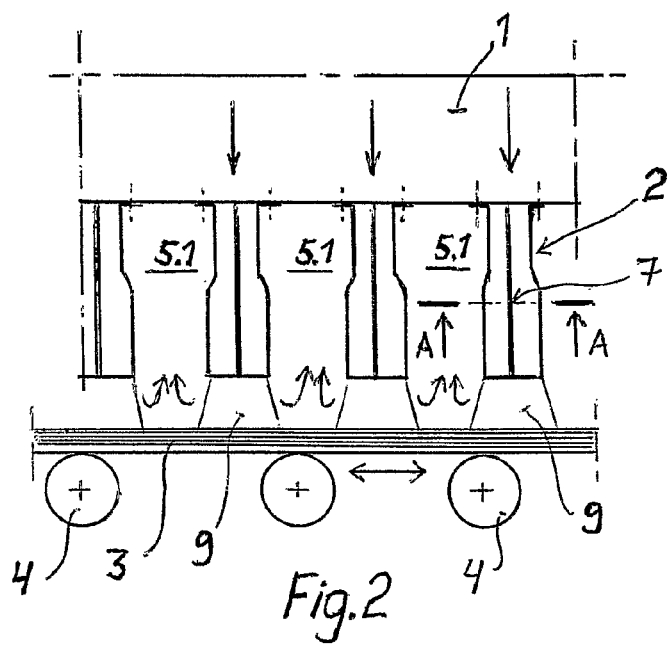
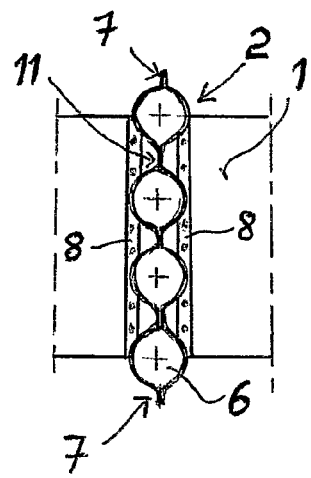
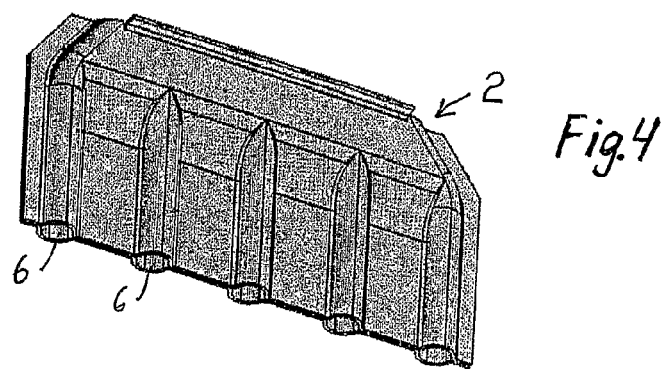
Fig. 1
Fig. 2
Fig. 3
Fig. 4

A-A

CONVECTION HEATING FURNACE FOR HEATING A GLASS SHEET

The invention relates to a convection heating furnace for glass sheet, into which furnace glass sheet arrives along a hauling track, as on moving rolls, and further said furnace comprises of heating elements, in order to heat the air, which is blasted against the glass sheet, a blaster and blast air channelling for blasting said air against the glass sheet, and the air blast channelling has elongated channels in the direction of the glass sheet motion, into which at least a part of the heating elements, which heat the blast air, are fitted, and each channel comprises air blasting means on its flank directed against the glass sheet.

Previously known are heating convection ovens according to the above preamble, among others from publications EPO 0910553 B1 and FI-application publication 20030482. In these ovens the air blast cannot be distributed evenly on the glass surface in regard t to then direction of the glass advance in cross direction. This is due to the fact that blasting cannot be effectively led to the glass surface in the space between the blast channels, since from the channel bottoms the outermost air blasts should be directed diagonally to the glass, so the blasts would hit the glass surface evenly. Surely, it is easy to direct the jets diagonally, but this results in that the blasts do not reach the glass surface, because they are affected by a strong air back flow from the flank, which, through the outermost jets, strives to turn up to the space between the blast channels. Thus the outermost blasts reach quite badly to the glass and in this spot the glass temperature stays lower than in other spots. Oscillation does not improve the situation in this direction.

Since, because of the above described, the heating of the glass remains scant in spaces between the blast channels about on 20-40 mm broad lanes from end to end on the glass, and these lanes become under certain circumstances noticeable lanes after the heat treating, as annealing. The quality of glass suffers from this and does not necessarily be fit for its purpose.

In order to remove this above described disadvantage a new convection heating furnace has been developed, in which furnace the blast glass heating air is characterized in that, there are as air blast elements nozzle groups fixed on the channel flank, where the nozzle group is made of sheet metal, as of two, into shape formed sheets joined together to form a casing, whereby said casing comprises one or several for blast air directed discharge channels, and the direction of flow in said casing is essentially the same as in said discharge channels.

The advantage of a convection heating furnace according to the invention is that, all the blasting nozzles can be directed at right angles against the glass. No spot of the glass surface is left at worse blasting, because it is possible to place the nozzle groups almost continually as queues in cross direction against the direction of the glass motion. Since the nozzle group is broader than the channel that works as fixing frame, the adjacent nozzle groups can be placed even slightly interlocked, whereby a complete nozzle queue formation in the cross direction of the glass is achieved. The nozzle groups can also be interlocked, so that they are turned at a smallish angle from a completely cross direction in regard to the channels. Between the nozzle groups some space remains for back air, where by the back air does not disturb the efficiency of the nozzle blasts. When all the nozzles are in right angle directed towards to glass, it is possible to let the nozzles down closer to the glass surface, while the distribution blow remains constant and while the heating efficiency of the blast air is high.

In the following the invention is disclosed with reference to the enclosed drawings, where:

FIG. 1 shows nozzle groups according to the invention seen from the direction of the glass motion.

FIG. 2 shows nozzle groups seen from direction of the bearing rolls.

FIG. 3 shows a section view of the nozzle group in direction A-A.

FIG. 4 shows a casing according to the invention diagonally seen from below.

Figure 5:
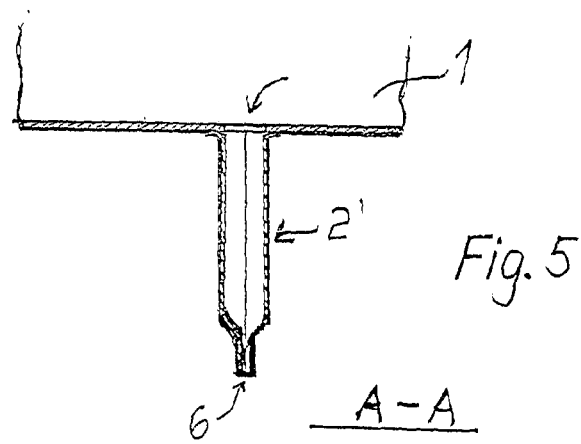
FIG. 5 shows the section a casing in direction A-A.

FIG. 1 shows a part of a convection heating furnace, in which there are rolls 4 as supports and as driver of the glass. Only the heating system of the glass 3 upper side is presented, but of course, on the glass under side the same system can be fitted upside down. The heating air flow runs along channels 1, mounted in the glass direction, heated by heating elements 12, and the flow turns down from the channel to each nozzle group. Each nozzle group is shaped as a casing 2. A casing like this is made, for instance, in squeezing sheet metal into shape so that two of such shaped sheets, when fitted together, form directed discharge nozzles 6 according to FIG. 3 viewed from the glass sheet direction. The air flow direction in shaped casing 2 is essentially the same as in the discharge nozzle 6.

For instance, the shaped sheets can be connected to each other by shot welding from spots on surfaces, where the sheets lean on each other, as surfaces 11 and edges 7. Casings 2 can be made broader than channels 1 whereby according to FIG. 1, casings 2 of adjacent channels 1 can be fixed to each other, whereby measure a=0. Then the casings are as an uniform queue. Casings 2 can be mounted a little interlocked, their structure does not prevent it. However, by means of the solution according to this invention and its variations, the blast free spot 10 on glass sheet 3 surface, marked between blast showers, can always be removed completely. FIG. 1 shows that space 5 left between the channels 1 is quite sufficient for return air, for instance if it is 15 mm-20 mm. Casing 2 is easily made, for instance, 20 mm-50 mm broader than channel 1, whereby a homogeneous cross blast queue is always achievable, where the spaces between blasts and the strength of blasts remain unchanged in spite of the distances between the casings.

FIG. 2 shows casing 2 from one side. Plenty of space for back air remains between consecutive casings, marked in the figure as sections 5.1. Via these spaces the return air gets up, not disturbing other blasts. After space 5.1 the return air gets up to space 5 between channels 1.

FIG. 3 shows casing 2 from glass 3 direction. Discharging openings 6 can even be squeezed almost into circles, but the most suitable form may be in different ways slightly flattened circle. In the edge of the casing there are foldings 8, from which the casing can, for instance, be shot welded into channel 1.

FIG. 4 shows casing 2 furnished with discharging openings 6 diagonally from the under side. The casing is broader than channel 1, also all casings of FIG. 1 has the same feature.

Figure 6:
FIG. 6 shows nozzle casings on the channel surfaces seen from the glass direction.
Figure 6:
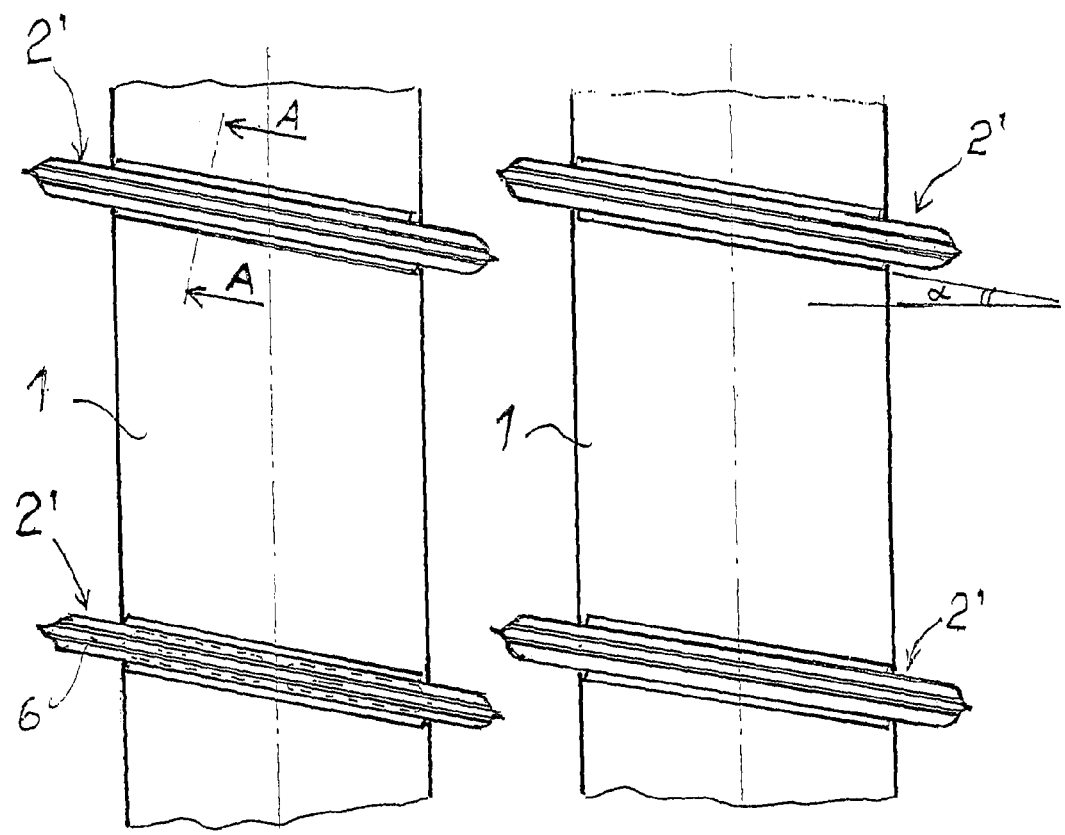

FIG. 5 shows a section view of nozzle casing 2', which has one narrow slot as discharging opening 6. Such a casing is more easily made than the casings of FIGS. 1-4. FIG. 6 shows casings according to FIG. 5 mounted by turning from a slightly crosswise direction onto the surface of the channel 1. Angle α is for example 10-20°. It is therefore easy to mount the casings as much overlapped as needed.

The invention claimed is:

1. A convection heating furnace for a glass sheet, which glass sheet arrives and moves along on moving rolls in a glass moving direction in said furnace, said furnace comprising:
- air heating elements which heat air, which heated air is then blasted against, the moving glass sheet,
- a plurality of elongated channels disposed laterally adjacent one another and longitudinally in the glass moving direction, said elongated channels capable of blasting the heated air moving in the glass moving direction the moving glass sheet, and into which said elongated channels at least a part of said air heating elements are fitted, and
- a respective row of elongated casings for each respective said elongated channel of said plurality of elongated channels, and each said row being disposed longitudinally along the respective said elongated channel,
- each said row of elongated casings having said elongated casings of each row a) disposed laterally adjacent one another and b) disposed longitudinally perpendicular to the glass moving direction, and
- each said elongated casing
  - being in fluid communication with the heated air in the respective said elongated channel,
  - redirecting the heated air in the respective said elongated channel against an adjacent portion of the moving glass to heat the glass,
  - including a row of air blasting nozzles, which said nozzles direct the heated air against the glass, said row of air blasting nozzles including a) flank air blasting nozzles at each side of said casing which direct heated air from the respective said elongated channel against the glass sheet, and b) one or more intermediate air blasting nozzles which are intermediate said flank air blasting nozzles,
  - including two shaped formed metal sheets with joints of each said sheet which are joined together to form said elongated casing including said air blasting nozzles,
  - having a direction of air flow in said elongated casing which is essentially in a same direction as an air flow in said air blasting nozzles,
- a casing space provided between consecutive said casings of each row, which said casing spaces serve as a first return route for the heated air after said heated air is directed at the moving glass and
- a channel space provided between adjacent said channels for the return air to move from said casing spaces.

2. A convection heating furnace according to claim 1, wherein the casing which includes the row air blasting nozzles is placed substantially crosswise with regard to the associated elongated channel.

3. A convection heating furnace according to claim 1, wherein the air blasting nozzles direct the heated air perpendicularly towards the glass sheet.

4. A convection heating furnace according to claim 1, wherein a breadth of the row of air blasting nozzles of an associated said casing is broader than a breadth of the associated said elongated channel to which the associated said casing is fixed.

5. A convection heating furnace according to claim 1, wherein the two joined metal sheets of the casing are joined together by shot welds.

6. A convection heating furnace according to claim 1, wherein the casing which includes the row air blasting nozzles is placed crosswise at a smallish angle of 10-20° with regard to the associated elongated channel.

* * * * *